April 26, 1960     C. E. SCHUTTE     2,934,744
HEADLIGHT DIMMER SWITCH AND TURN SIGNAL CONTROL
Filed Sept. 26, 1958
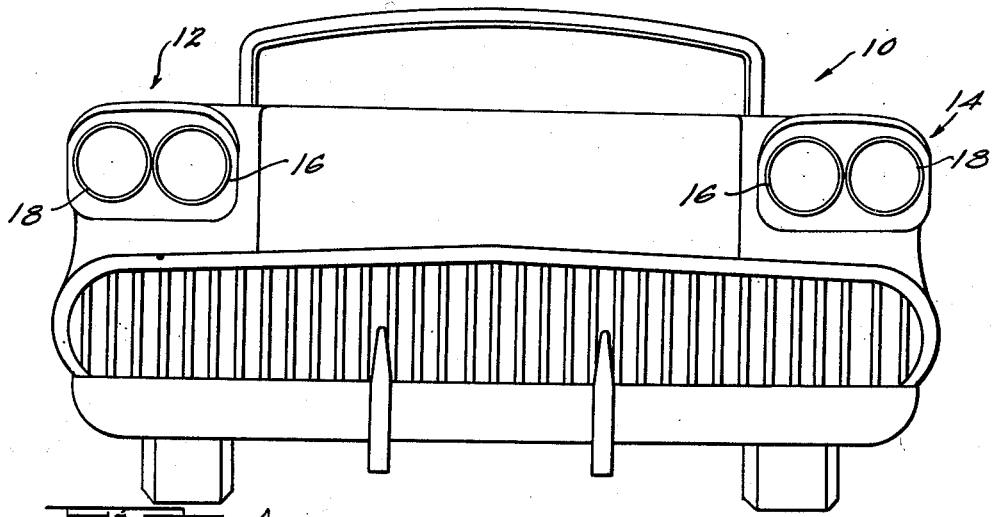
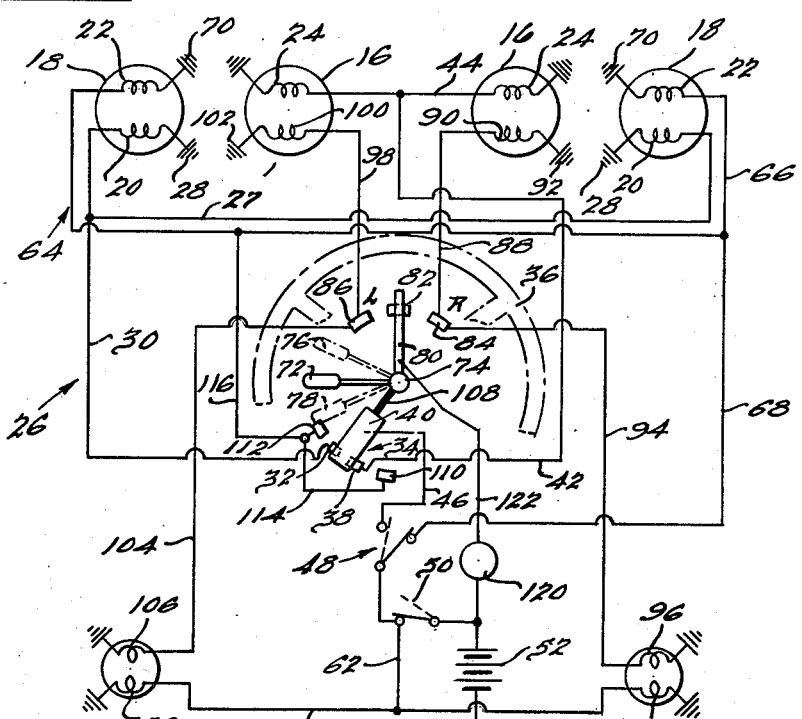
INVENTOR.
Charles E. Schutte.
BY
Harness, Dickey & Pierce.
ATTORNEYS.

United States Patent Office 2,934,744
Patented Apr. 26, 1960

2,934,744

HEADLIGHT DIMMER SWITCH AND TURN SIGNAL CONTROL

Charles E. Schutte, Grosse Pointe Woods, Mich., assignor, by mesne assignments, to Bank of America National Trust and Savings Association, a national banking association Application September 26, 1958, Serial No. 763,523

3 Claims. (Cl. 340—76)

This invention relates generally to the lighting systems on automotive vehicles and more particularly to the assembly of the turn signals with the vehicle headlights so that when a turn signal is actuated the headlights are dimmed.

Because the bright beams from an automobile headlights blind the drivers of oncoming automobiles, actuation of the turn signals on the automobile when the headlights are on bright beam is ineffective as a signal to oncoming drivers. This invention provides for an automatic dimming of the vehicle headlights when the turn signals are actuated. As a result, the necessary observation of the turn signal by drivers of oncoming vehicles is assured.

It is an object of this invention, therefore, to provide an improved assembly of the headlights and turn signals so that the signals will be readily observable at all times by oncoming traffic.

It is a further object of this invention to provide, in a twin headlight and turn signal assembly in which the headlight beams are automatically dimmed when the turn signals are actuated, a mounting of the turn signals in the headlights.

Further objects, features and advantages of this invention will become apparent from a consideration of the following description, the appended claims and the accompanying drawing in which:

Figure 1 is a front view of a vehicle having a twin headlight assembly and turn signals incorporated in the headlights; and Fig. 2 is a circuit diagram showing the filaments for the headlights and the turn signals in the lighting system of this invention.

With reference to the drawing, the headlight and turn signal assembly of this invention is shown mounted on a vehicle 10 having right and left twin headlight assemblies 12 and 14, respectively. Each assembly 12 and 14 includes an inner headlight 16 and an outer headlight 18 of usual type consisting of a parabolic reflector, a lighting filament or filaments, and a glass cover or lens.

As shown diagrammatically in Fig. 2, each outer headlight 18 has a high beam filament 20 and a low beam filament 22. Each high beam filament 20 is spaced from the focal point of its reflector so that light therefrom is spread on the road adjacent the front end of the automobile. Each low beam filament 22 is located on the focal point of its corresponding reflector and directs the light downwardly ahead of the vehicle 10.

Each inner headlight 16 has a high beam filament 24 positioned on the focal point of its reflector so that light therefrom is directed forwardly from the vehicle 10. The high beam filaments 20 and 24 are connected in a "bright" circuit, indicated generally at 26 in Fig. 2, which includes a conductor 27 that connects the filaments 20 which are grounded at 28.

A conductor 30 connects the conductor 27 to one stationary contact 32 in a switch mechanism indicated generally at 34 positioned adjacent the automobile steering wheel 36. In addition to the stationary contact 32, the switch 34 includes a second stationary conductor 38 and a movable blade conductor 40 of a size to bridge the stationary contacts 32 and 38. A conductor 42 connects the stationary contact 38 to a conductor 44 which connects the high beam filaments 24.

A conductor 46 connects the movable blade 40 to the usual foot-operated dimmer switch 48 which is in turn connected, through a manually operable "on/off" switch 50 to the vehicle battery 52, which is grounded as indicated at 54.

It can thus be seen that whenever the dimmer switch 48 is in the position shown in broken lines in Fig. 2, and the movable blade contact 40 bridges the contacts 32 and 38, the bright circuit 26 is closed through the filaments 20 and 24. The road immediately ahead of the vehicle 10 is thus illuminated by the light from the filaments 24 and the road adjacent the front end of the automobile is illuminated by the light from the filaments 20. Whenever the manually operated switch 50 is in its closed position indicated in solid lines in Fig. 2, the vehicle tail light filaments 58 are in a closed circuit which includes the conductor 60 which extends between the filaments 58 and a conductor 62 which connects the conductor 60 to the switch 50.

The low beam filaments 22 are connected in a "dim" circuit indicated generally at 64 in Fig. 2. The circuit 64 includes a conductor 66 which connects the filaments 22 and a conductor 68 which connects the conductor 66 to the dimmer switch 48. When the switch 48 is in its low beam position illustrated in solid lines in Fig. 2, a circuit is completed from the battery 52 through the low beam filaments 22 which are grounded as indicated at 70.

The turn signal mechanism for the vehicle 10 includes the usual control lever 72 rotatably mounted on the vehicle steering column 74 for movement between a right turn indicating position 76, a left turn indicating position 78, and an intermediate non-indicating position. The lever 72 is connected to a switch arm 80, which engages an insulated neutral contact 82 in the non-indicating position. In the right turn indicating position 76 of the lever 72, the arm 80 engages a stationary right turn contact 84. In a left turn indicating position of the control lever 72, the arm 80 engages a left turn stationary contact 86. The contact 84 is connected to a conductor 88 which is connected to a filament 90 mounted in the headlight 16 and grounded as indicated at 92. The filament 90 is of a size to provide the desired light for turn-indicating purposes and is spaced from the focal point of the reflector in the headlight 16. The contact 84 is also connected by a conductor 94 to a grounded right turn indicating filament 96 in one of the taillights.

The left turn indicating contact 86 is connected through a conductor 98 to a left turn indicating filament 100 in the inner headlight 16 on the left hand side of the automobile 10. The filament 100 is grounded as indicated at 102. A conductor 104 connects the contact 86 with a grounded filament 106 in the taillight on the left hand side of the automobile.

The switch blade 40 in the switch mechanism 34 is mounted on a supporting arm 108 which is constructed of an insulating material and connected to the turn signal control lever 72 so that in the left turn indicating position 78 of the lever 72, the blade 40 is moved out of a position bridging the contacts 32 and 38 to a position engaging only a fixed contact 110 mounted adjacent the contact 38. In the right turn indicating position 76 of the lever 72, the blade 40 is moved to a position engaging only a fixed contact 112 disposed adjacent the switch contact 32 and connected to the contact 110 by conductor 114. The contact 112 is connected by means of a conductor 116 to the conductor 66 which connects the low beam filaments 22.

Consequently, when the turn signal control lever 72 is moved to either of the turn signal indicating positions, the blade 40 for the switch 34 is moved out of the position bridging the contacts 32 and 38 so that the bright circuit 26 is opened at the switch 34. The blade 40 is moved into a position in which it engages either the contact 110 or the contact 112 so that it connects the conductors 46 and 116, thus closing the dim circuit 64 even though the dimmer switch 48 is in its broken line bright beam position. In the event the dimmer switch 48 is in its solid line dim position, movement of the blade 40 to either of the contacts 110 or 112 is of course ineffective to accomplish any change in the condition of the headlights 16 and 18 since the high beam circuit 26 is already open at the switch 48.

The usual flasher light 120 is connected by a conductor 122 to the battery 52 and the switch arm 80 so that in a turn indicating position of the arm 80, the flasher light 120 is energized to indicate to the driver that the turn signals are being actuated. The conductor 122 also connects a contact 84 or 86 with the battery 52 in a position of the arm 80 in engagement with a contact 84 or 86.

From the above description, it is seen that this invention provides for an automatic control of the headlights 16 and 18 in response to manipulation of the turn signal control lever 72 so that when the lever 72 is operated, the headlights assemblies 12 and 14 are automatically dimmed. Consequently, the driver of an oncoming car cannot be blinded by the headlights on the vehicle 10 so that he fails to observe a turn signal on the vehicle 10. By virtue of this control of the headlights 16 and 18, so that no driving light is issuing from the inner headlights 16 when the lever 72 is in a turn-indicating position, the lights 16 are usable additionally as turn signal lights. They provide a convenient and inexpensive mounting for the front turn signal filaments 90 and 100, thereby reducing the cost of installation of turn signals on vehicle 10. With this arrangement, the headlights 16 are also usable for enclosing parking light filaments. It is to be understood, however, that the assembly of this invention is also usable with turn signal lights which are separately mounted at positions spaced from the headlights.

It will be understood that the specific construction of the improved turn signal assembly herein disclosed and described is presented for purposes of explanation and illustration and is not intended to indicate limits of the invention, the scope of which is defined by the following claims.

What is claimed is:

1. In a vehicle having headlights provided with a bright circuit and a dim circuit, right and left turn signal filaments, and turn signal control means operable to selectively complete a circuit through said right or left turn signal filaments, the combination of switch means connected to said bright and dim circuits and said signal filaments and operable in response to operation of said turn signal control means to open said bright circuit and close said dim circuit.

2. In a vehicle having headlights provided with a bright circuit and a dim circuit, right and left turn signal filaments, and a turn signal control lever operable to selectively complete a circuit through said right or left turn signal filaments, the combination of switch means connected to said lever, said switch means being connected to said bright and dim circuits and said signal filaments and being operable on movement of the lever to a turn signal circuit completing position to open said bright circuit and close said dim circuit.

3. In a vehicle having a pair of twin headlight assemblies each of which consists of an outer headlight and an inner headlight spaced apart in a direction transversely of the vehicle, a high beam filament in each of said headlights, a low beam filament in the outer headlight in each assembly, a bright circuit having said high beam filaments therein, a dim circuit having said low beam filaments therein, and dimmer switch means movable between a first position closing said bright circuit and a second position closing said dim circuit; the combination of a right turn signal filament in one of said inner headlights and a left turn signal filament in the other one of said inner headlights, circuit means for each of said turn signal filaments, control means operable to selectively complete a circuit through said right or left turn signal filaments and switch means connected to said bright and dim circuits and said signal filaments and operable in response to operation of said turn signal control means to open said bright circuit and close said dim circuit.

References Cited in the file of this patent
UNITED STATES PATENTS

| | | |
|---|---|---|
| 1,656,821 | Hanson | Jan. 17, 1928 |
| 1,683,496 | Stevens | Sept. 4, 1928 |
| 2,186,911 | Erickson | Jan. 9, 1940 |